United States Patent
Kwasniewski

[19]

[11] Patent Number: 5,979,903
[45] Date of Patent: Nov. 9, 1999

[54] TRANSLUCENT SLINGER WITH CENTRIFUGAL SEAL

[75] Inventor: Dale Kwasniewski, Galesburg, Mich.

[73] Assignee: Sanford Acquisition Company, Bingham Farms, Mich.

[21] Appl. No.: 08/984,783

[22] Filed: Dec. 4, 1997

[51] Int. Cl.[6] .............................. F16J 15/42; F01D 11/02
[52] U.S. Cl. .......................... 277/423; 277/424; 277/549
[58] Field of Search .................................. 277/423, 424, 277/425, 560, 549, 553

[56] References Cited

U.S. PATENT DOCUMENTS

| | | | |
|---|---|---|---|
| 2,418,707 | 5/1947 | Groot | 277/425 |
| 2,478,649 | 12/1949 | Wightman | 277/424 |
| 3,482,844 | 12/1969 | McKinven | 277/423 |
| 4,341,130 | 7/1982 | Shepherd et al. | 74/574 |
| 4,397,470 | 8/1983 | Carroll et al. | |
| 4,427,202 | 1/1984 | Backlin | |
| 4,484,752 | 11/1984 | Bentley | 277/377 |

*Primary Examiner*—Chuck Y. Mah
*Assistant Examiner*—Alison K. Pickard
*Attorney, Agent, or Firm*—Liniak, Berenato, Longacre & White

[57] ABSTRACT

A slinger for use between a housing and a rotatable member passing therethrough includes an engaging member for mounting on the rotatable member, a slinger portion extending radially outward from the engaging portion, and a sealing portion generally axially extending from the slinger portion wherein the sealing portion extends radially outward when subjected to centrifugal force caused by rotation of the rotatable member to form a secondary seal. The slinger may be formed of a translucent polymer to facilitate a visual inspection of a primary seal located behind the slinger.

20 Claims, 2 Drawing Sheets

TRANSLUCENT SLINGER WITH CENTRIFUGAL SEAL

TECHNICAL FIELD

The present invention relates to a slinger for keeping debris away from a primary seal.

BACKGROUND ART

Seals are commonly employed between rotating shafts and housings to protect elements within the housing from corrosion and contamination and to prevent fluids within the housing from exiting through the shaft opening. These seals will be referred to as primary seals.

Primary seals are subject to corrosion and abrasion and are often protected by slingers. A slinger may be attached to a shaft between the primary seal and the exterior environment. As the shaft rotates, material that contacts the slinger is flung from the slinger due to centrifugal force. Unlike the primary seal, however, a slinger typically does not contact the housing, providing the opportunity for debris to get past the slinger and onto the primary seal.

Prior art slingers are generally made of low carbon steel and are therefore rigid and opaque. While such materials provide a durable, low-cost component, they do not facilitate visual inspection of the primary seal, particularly during assembly. Furthermore, such rigid materials may be damaged during the installation process or may damage the primary seal or the shaft if appropriate care is not exercised.

SUMMARY OF THE INVENTION

As such, one object of the present invention is to provide an apparatus that deflects material away from a primary seal while also providing a secondary seal.

A further object of the present invention is to provide a slinger and seal which facilitate visual inspection of the primary seal without unseating the slinger during assembly.

Yet another object of the present invention is to provide a combination slinger and secondary seal which cooperates with a primary seal to reduce or eliminate debris which may contact a rotating shaft.

A still further object of the present invention is to provide an integrated slinger and centrifugal seal which may be deflected to inspect a primary seal.

Yet another object of the present invention is to provide an integrated slinger and centrifugal seal which cooperates with a deflector of the primary seal to provide a further barrier to contamination.

In carrying out the above objects and other objects and features of the present invention, a slinger is constructed with an engaging portion for coupling the slinger to a shaft, a slinger portion for deflecting and slinging debris away from a primary seal, and a sealing portion which provides a secondary seal during rotation of the shaft. Preferably, at least the sealing portion is made of a flexible translucent material to facilitate visual inspection of the primary seal, either through the slinger or by deflecting a portion thereof.

An assembly is provided in accordance with the present invention for using the slinger in cooperation with a housing, a rotatable member such as a shaft, and a primary seal.

The present invention provides a number of advantages relative to prior art slingers. For example, the present invention offers an additional barrier to contamination of a primary oil seal only during rotation of the rotating member which facilitates inspection of the primary seal during assembly. Appropriate selection of a non-opaque polymer material for the slinger also facilitates visual inspection of the primary seal through the slinger to verify installation of the primary seal without unseating the slinger. A polymer material also allows deflection of the slinger to examine the primary seal while virtually eliminating potential handling damage to the primary seal or shaft during the assembly process.

The above objects and other objects, features, and advantages of the present invention are readily apparent from the following detailed description of the best mode for carrying out the invention when taken in connection with the accompanying drawings.

BEST MODE(S) FOR CARRYING OUT THE INVENTION

Figure 1:
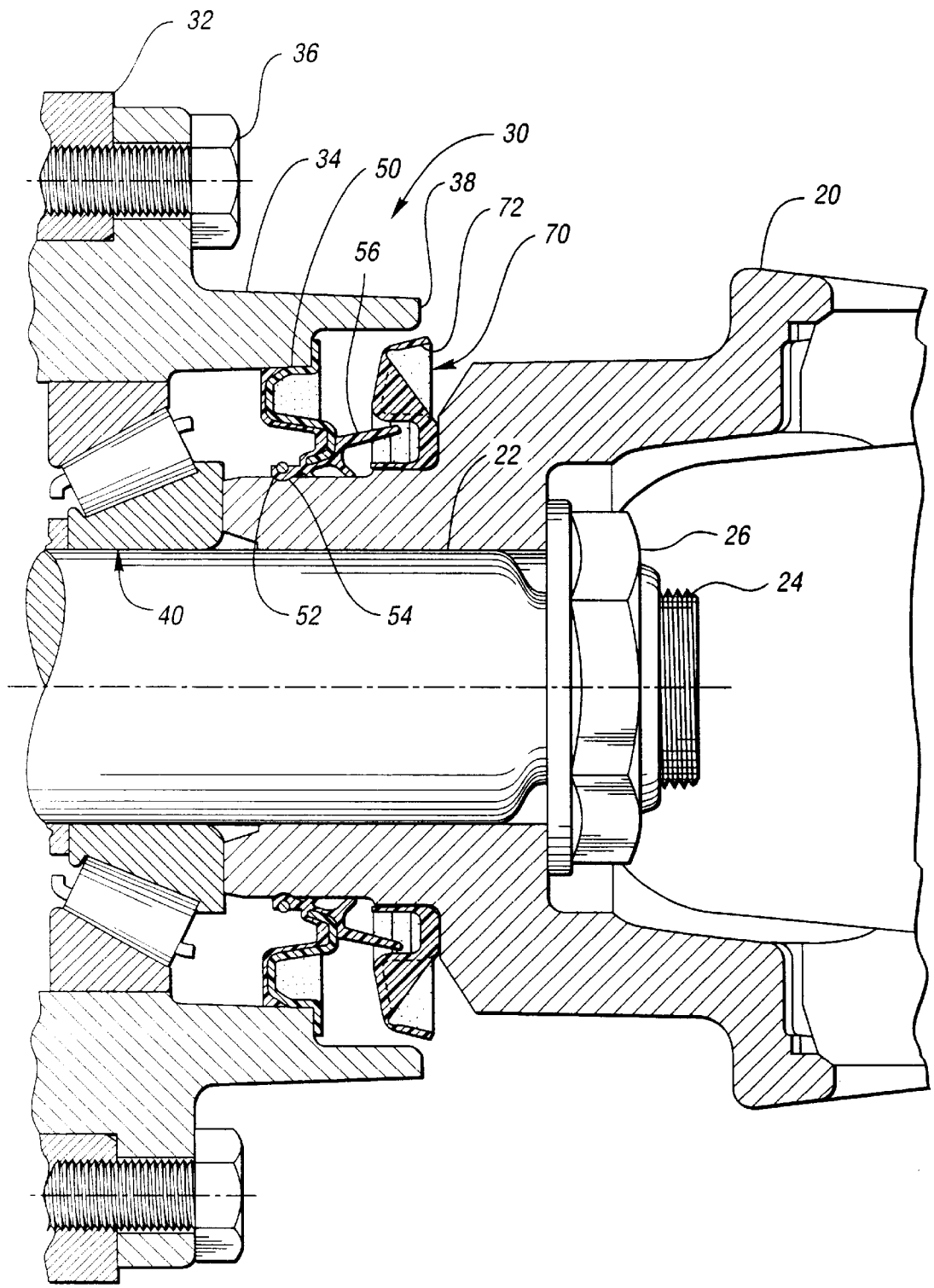
FIG. 1 is a cross-section of a drive axle head assembly having a drive shaft yoke, primary oil seal, and integrated slinger and secondary seal according to the present invention.

Referring now to FIG. 1, a partial cross-section of a drive axle head assembly is shown to illustrate one of the many potential applications for a slinger seal according to the present invention. A drive yoke 20 is rotated by a drive mechanism (not shown), as is well known to one of ordinary skill in the art. Drive yoke 20 is coupled to a drive pinion shank 22 through cooperating splines (not shown) cut on the outside of the shaft and inside of the yoke opening. Shaft 22 has a threaded end 24 for accepting a yoke nut 26 for holding yoke 20 to shaft 22.

A housing assembly, indicated generally by reference numeral 30, is formed by an axle carrier 32 and pinion bearing cage 34 which is secured to carrier 32 using a plurality of pinion bearing cap screws 36. Bearing cage 34 has a lip 38, which extends over a portion of yoke 20. The stationary housing assembly 30 is rotatively isolated from shaft 22 through an outer pinion bearing assembly 40.

Bearing assembly 40 and other elements within housing assembly 30 are protected from corrosive and abrasive elements by a primary seal 50, which is a radial lip oil seal assembly in one embodiment of the present invention. Primary seal 50 is held in housing 30 by way of an interference fit. Primary seal 50 maintains a uniform contact with yoke 20 by way of garter spring 52 over primary seal lip 54. A generally radially extending deflector 56 forms an integral part of primary seal 50 and prevents large debris from contacting yoke 20 near the sealing surface. However, primary seal 50 may still be subject to damage from various debris which may include corrosive and abrasive elements from outside housing assembly 30. To protect primary seal 50 and, hence, bearing assembly 40 and other elements within housing assembly 30, a slinger 70 with an integrated secondary centrifugal seal according to the present invention is employed. Slinger 70 engages a journal on yoke 20 through an interference fit so as to rotate with yoke 20. As slinger 70 rotates, a generally axially extending sealing portion 72 deforms radially outward due to centrifugal force so as to come nearer to or in contact with pinion bearing cage lip 38 thereby forming a partial or complete secondary seal. A concave annular region of slinger 70 cooperates with deflector 56 to further shield the sealing surface of yoke 20 and primary seal 50.

Figure 2:
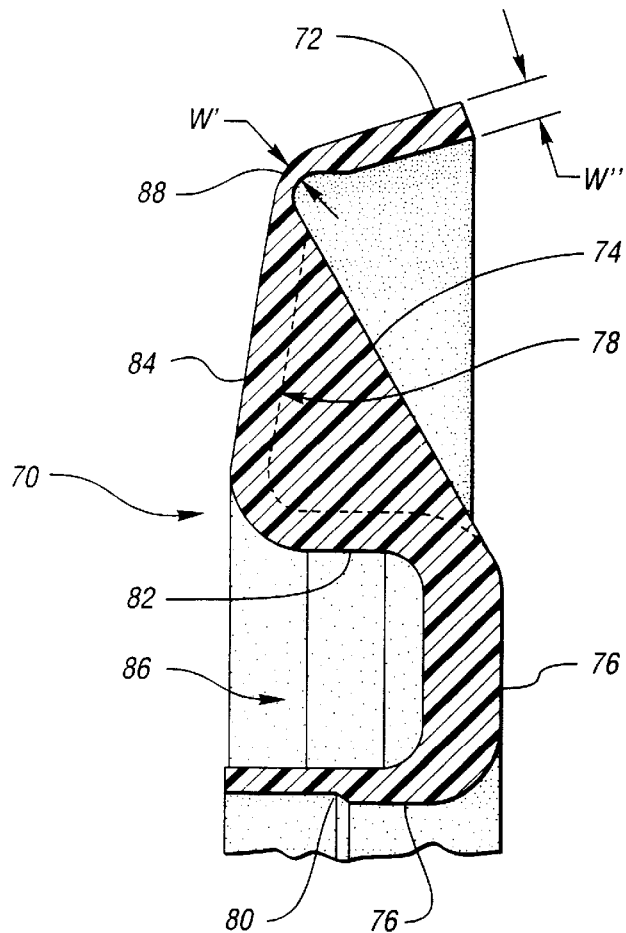
FIG. 2 is a plan view of one embodiment of a slinger seal according to the present invention.
Figure 3:
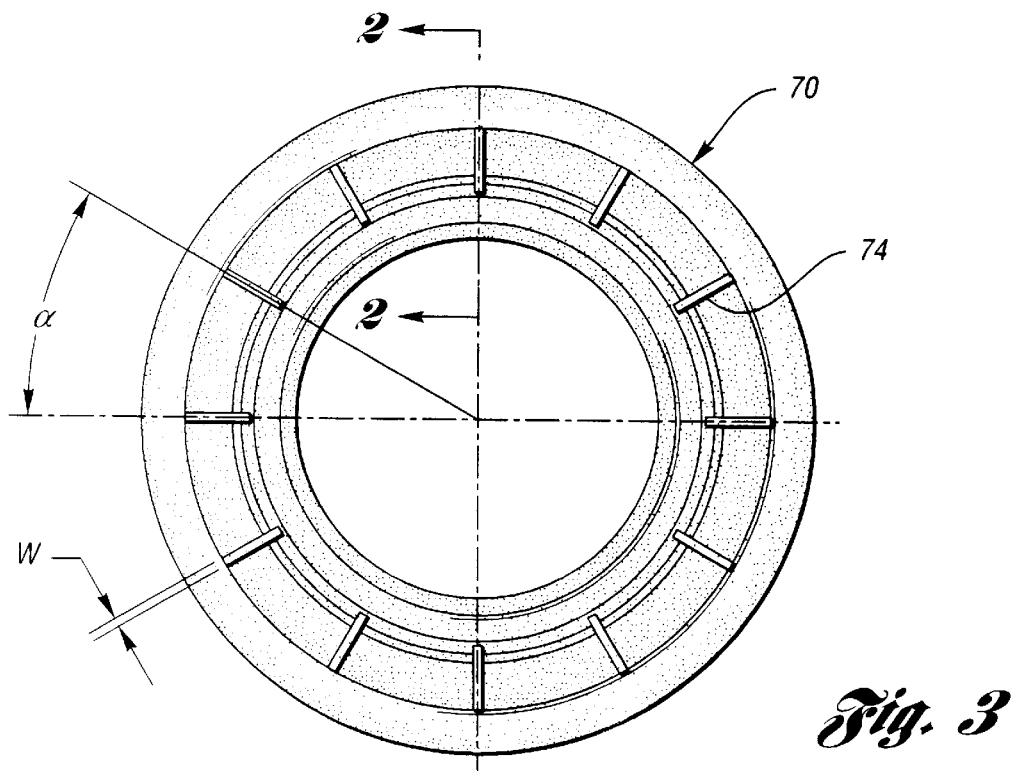
FIG. 3 is a section view taken along line 3—3 of FIG. 2 showing additional details of one embodiment according to the present invention.

Referring now to FIG. 2, a sectional view of one embodiment of a slinger according to the present invention is shown. Slinger 70 includes a plurality of ribs 74 (best illustrated in FIG. 3) extending from an "L"-shaped engaging portion 76 having to a similarly shaped but oppositely oriented "L"-shaped slinging portion 78. Engaging portion 76 includes a "foot" portion which engages the circumference of yoke 20. In the embodiment shown, slinger 70 preferably has an inside diameter sized for an interference fit with yoke 20, the amount of interference being approximately 0.84 millimeters (0.033 inches). Lip 80 of engaging portion 76 cooperates with a corresponding annular detent in yoke 20 to prevent slinger 70 from moving axially along yoke 20. The interference fit of engaging portion 76 about yoke 20 forms a seal to prevent contaminants from reaching primary seal 50 while causing slinger 70 to rotate with yoke 20.

Slinging portion 78 is preferably continuous and integrally formed with engaging portion 76. As previously indicated, slinging portion 78 has an "L"-shaped cross section including foot portion 82 and leg portion 84. The inside diameter of foot portion 82 in conjunction with engaging portion 76 defines a concave annular region 86. When installed, primary seal deflector 56 extends within annular region 86 to provide an additional barrier to debris, such as mud, oil, or pressure wash spray.

Slinging portion 78 operates as a slinger, deflecting material from primary seal 50 and slinging material away from yoke 20 when yoke 20 is rotating. As such, slinging portion 78 should have a rigidity sufficient to deflect or sling the majority of debris encountered in a typical application. Appropriate rigidity may be accomplished using a plurality of rib elements 74 extending between foot portion 82 and leg portion 84 of slinging portion 78. In one embodiment, twelve rib elements, each having a nominal thickness W of approximately 1.5 millimeters (0.06 inches), are substantially evenly spaced around the circumference of the slinger seal at a nominal angular spacing α of about 30° (best illustrated in FIG. 3). Alternatively or in combination with two or more ribs, a relatively more rigid material may be used in combination with a flexible material to provide the centrifugal seal. However, ribbing may be more desirable than a rigid material or increasing the thickness of the material since the ribs provide for a thinner material which accommodates visual inspection through a translucent slinger as explained in greater detail below. Of course, other arrangements are possible without departing from the spirit or scope of the present invention.

Sealing portion 72 may include a hinge portion 88 having a smaller cross-sectional area than surrounding regions to facilitate radially outward deflection and elastic deformation of sealing portion 72 to form a centrifugal seal. For example, in one embodiment, sealing portion 72 will have a thickness W" of approximately 1.4 millimeters (0.055 inches) except in hinge portion 86, where the thickness will decrease to W', approximately 0.8 millimeters (0.03 inches). As rotational speed of yoke 20 and slinger 70 increases, sealing portion 72 continues to move radially outward until making contact with housing assembly 30. In addition, viscous debris, such as mud, oil, snow, or the like, which contacts slinging portion 78 will tend to travel radially outward and apply an additional force to sealing portion 72 as a result of the slinging action. This should further improve the sealing performance of slinger 70.

The slinger will preferably be constructed of an engineering grade polymer. Also preferably, the selected polymer will be sufficiently translucent so that primary seal 50 may be inspected by examination through the slinger. As such, one or more portions of the slinger may be non-opaque or sufficiently translucent, such as the slinging portion, engaging portion, or sealing portion. For inspection during assembly, sufficient translucence is that which allows a visual inspection to determine the presence or absence of primary seal 50. To facilitate such an inspection, primary seal 50 may be brightly colored.

The primary seal 50 may also be inspected by deflecting a portion of slinger 70, such as sealing portion 72. Alternatively or in combination, slinging portion 78 may also be deflected which is generally more difficult due to its increased rigidity. Preferably, any portion which is deflected will not disturb engaging portion 76.

It will be recognized by one with ordinary skill in the art that this invention may be constructed from a variety of materials and in a variety of configurations to obtain the features described herein. Furthermore, the slinger according to the present invention may be adapted to perform in a variety of applications including but not limited to differentials, transmissions, engines, and axles.

Thus, the present invention provides an integrated slinger and secondary seal which affords an additional barrier to contaminants while facilitating inspection of a primary seal, particularly during assembly, without unseating of the slinger While the best modes for carrying out the invention have been described in detail, those familiar with the art to which this invention relates will recognize various alternative designs and embodiments for practicing the invention within the scope of the following claims.

What is claimed is:

1. In combination a slinger, a housing and a rotatable member passing through the housing, the slinger comprising:
   an engaging portion mounted on the rotatable member;
   a slinger portion extending radially outward from the engaging portion and;
   a sealing portion extending radially outward from the engaging portion, wherein the sealing portion extends radially outward to make contact with said housing when subjected to centrifugal force caused by rotation of the rotatable member to form a seal between the rotatable member and the housing.

2. The slinger of claim 1 wherein the slinger is made from a polymer material.

3. The slinger of claim 1 wherein at least a portion of the slinger is translucent.

4. The slinger of claim 1 wherein the slinging portion is sufficiently translucent to determine presence or absence of a primary seal.

5. The slinger of claim 1 further comprising:
   a plurality of ribs each extending between the engaging portion and the slinging portion to increase rigidity of the slinging portion.

6. The slinger of claim 5 wherein the plurality of ribs are substantially evenly spaced.

7. The slinger of claim 5 wherein the plurality of ribs are substantially evenly spaced with an angular spacing of about thirty degrees.

8. The slinger of claim 1 wherein the slinger is integrally formed of an engineering polymer material being sufficiently non-opaque to determine presence or absence of a primary seal.

9. The slinger of claim 1 wherein the engaging portion and the slinging portion define an annular concave region for cooperation with a primary seal.

10. The slinger of claim 1 wherein the sealing portion extends generally axially before deflection due to centrifugal force.

11. The slinger of claim 1 wherein at least the sealing portion is flexible enough to allow deflection thereof for inspection of a primary seal without unseating the engaging portion.

12. A assembly comprising:
   a housing separating an enclosed interior region from an exterior region and containing an opening;
   a shaft passing through the opening in the housing;
   a first seal between the shaft and the housing for resisting fluid flow from the interior region to the exterior region and resisting contamination of the interior region from exterior contaminants; and
   a slinger mounted on the shaft and secured for rotation therewith, the slinger being positioned between the first seal and the exterior region, the slinger having an engaging portion mounted on the shaft, a slinger portion extending radially outward outward from the engaging portion, and an integrated sealing portion extending in a generally axial direction from the slinger portion, wherein the sealing portion extends radially outward to make contact with the housing when subject to centrifugal force caused by rotation of the shaft.

13. The assembly of claim 12 wherein the slinger is made from a polymer material.

14. The assembly of claim 12 wherein the slinger is sufficiently translucent to allow the first seal to be examined through the slinger.

15. The assembly of claim 12 wherein the slinger is made from a polymer material which is sufficiently non-opaque so that presence or absence of the first seal may be determined by a visual inspection of the first seal through the slinger.

16. The assembly of claim 12 wherein the slinging portion of the slinger is sufficiently translucent to determine presence or absence of a primary seal.

17. The assembly of claim 12 wherein the slinger further includes a plurality of ribs each extending between the engaging portion and the slinging portion to increase rigidity of the slinging portion.

18. The assembly of claim 12 wherein the slinger includes a plurality of substantially evenly space ribs each extending between the engaging portion and the slinging portion to increase rigidity of the slinging portion.

19. The assembly of claim 12 wherein the engaging portion and the slinging portion of the slinger define an annular concave region and wherein the first seal includes a deflector extending generally axially within the concave region to provide an additional contamination barrier.

20. A slinger for a drive axle assembly, the drive axle assembly including an axle housing separating an enclosed interior region from an exterior region and containing an opening, a shaft passing through the opening in the axle housing, a primary seal mounted in the axle housing and surrounding the shaft in sealing contact with a drive yoke extending within the opening and connected to the shaft, the primary seal including a generally axially extending deflector, the slinger comprising:
   an engaging portion having an interior diameter sized for an interference fit with the drive;
   a slinger portion extending radially outward from the engaging portion, wherein the slinger portion and the engaging portion define an annular concave region for cooperation with the deflector of the primary seal;
   a plurality of equally angularly spaced ribs extending between the engaging portion and the slinger portion to increase the rigidity of the slinger portion;
   an integrated sealing portion extending in a generally axial direction from the slinger portion, wherein the sealing portion extends radially outward when subjected to centrifugal force caused by rotation of the drive yoke.

* * * * *